US007715440B2

(12) United States Patent
Comps et al.

(10) Patent No.: US 7,715,440 B2
(45) Date of Patent: May 11, 2010

(54) DEVICE FOR GENERATING A MULTIMEDIA FILE ADDRESSED TO A TELECOMMUNICATIONS TERMINAL AND RELATED MULTIMEDIA FILE

(75) Inventors: Christophe Comps, Toulouse (FR); Philippe Beaux, Bois-Colombes (FR)

(73) Assignee: Alcatel, Paris (FR)

( * ) Notice: Subject to any disclaimer, the term of this patent is extended or adjusted under 35 U.S.C. 154(b) by 1852 days.

(21) Appl. No.: 10/297,175

(22) PCT Filed: Apr. 2, 2002

(86) PCT No.: PCT/FR02/01141

§ 371 (c)(1),
(2), (4) Date: Dec. 3, 2002

(87) PCT Pub. No.: WO02/082770

PCT Pub. Date: Oct. 17, 2002

(65) Prior Publication Data

US 2003/0172384 A1 Sep. 11, 2003

(30) Foreign Application Priority Data

Apr. 5, 2001 (FR) .................................. 01 04663

(51) Int. Cl.
*H04H 20/28* (2008.01)
*H04J 3/02* (2006.01)
*H04J 3/06* (2006.01)
*G06F 15/16* (2006.01)

(52) U.S. Cl. ...................... 370/487; 370/537; 370/503; 709/231

(58) Field of Classification Search ................. 370/345, 370/350, 503, 509, 510, 389, 394, 396, 487, 370/517, 537, 538; 455/3.01, 3.06; 709/231; 725/87, 86, 91, 103, 148
See application file for complete search history.

(56) References Cited

U.S. PATENT DOCUMENTS 5,594,736 A * 1/1997 Tatsumi et al. .............. 370/474
5,623,690 A   4/1997 Palmer et al.
5,854,873 A * 12/1998 Mori et al. ................... 386/92
5,923,655 A * 7/1999 Veschi et al. ............... 370/394

(Continued)

FOREIGN PATENT DOCUMENTS

EP          1075100 A1    2/2001

OTHER PUBLICATIONS

F. Rousseau et al, Synchronized Multimedia for the WWW, Computer Networks and ISDN Systems, North Holland Publishing, Amsterdam, NL, vol. 30, No. 1-7, Apr. 1, 1998, pp. 417-429, XP004121405.

*Primary Examiner*—Hong Cho
*Assistant Examiner*—Hicham B Foud
(74) *Attorney, Agent, or Firm*—Sughrue Mion, PLLC

(57) ABSTRACT

Different types of media (text, sound, animated images, . . . ) are transmitted to a relay center. According to the invention, this data is split up in terms of common synchronization points (PS0, . . . , PS4), and packets are assembled together combing all of the data of each media type that is defined between identical synchronization points. As a result, each packet contains data that is to be executed simultaneously on the telecommunications terminal. A particular application lies with mobile terminals.

10 Claims, 3 Drawing Sheets

U.S. PATENT DOCUMENTS

| | | | | |
|---|---|---|---|---|
| 6,061,696 A | * | 5/2000 | Lee et al. | 715/513 |
| 6,064,796 A | * | 5/2000 | Nakamura et al. | 386/131 |
| 6,243,676 B1 | * | 6/2001 | Witteman | 704/243 |
| 6,249,319 B1 | * | 6/2001 | Post | 348/515 |
| 6,449,653 B2 | * | 9/2002 | Klemets et al. | 709/231 |
| 6,557,041 B2 | * | 4/2003 | Mallart | 709/231 |
| 6,710,815 B1 | * | 3/2004 | Billmaier et al. | 348/515 |
| 6,751,623 B1 | * | 6/2004 | Basso et al. | 707/101 |
| 6,778,493 B1 | * | 8/2004 | Ishii | 370/229 |
| 6,965,926 B1 | * | 11/2005 | Shapiro et al. | 709/219 |
| 6,985,966 B1 | * | 1/2006 | Gupta et al. | 709/248 |
| 6,999,424 B1 | * | 2/2006 | Kovacevic et al. | 370/252 |
| 7,096,487 B1 | * | 8/2006 | Gordon et al. | 725/91 |
| 7,188,353 B1 | * | 3/2007 | Crinon | 725/32 |
| 7,221,405 B2 | * | 5/2007 | Basson et al. | 348/468 |
| 2002/0025143 A1 | * | 2/2002 | Kashiwagi et al. | 386/126 |
| 2002/0103919 A1 | * | 8/2002 | Hannaway | 709/231 |
| 2002/0194364 A1 | * | 12/2002 | Chase et al. | 709/236 |

\* cited by examiner

FIG. 2
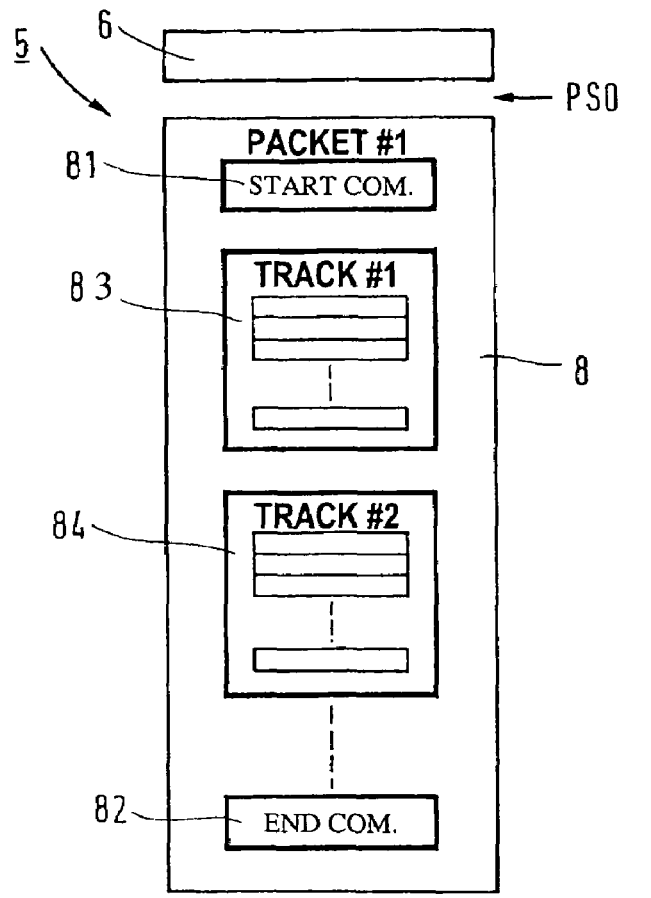
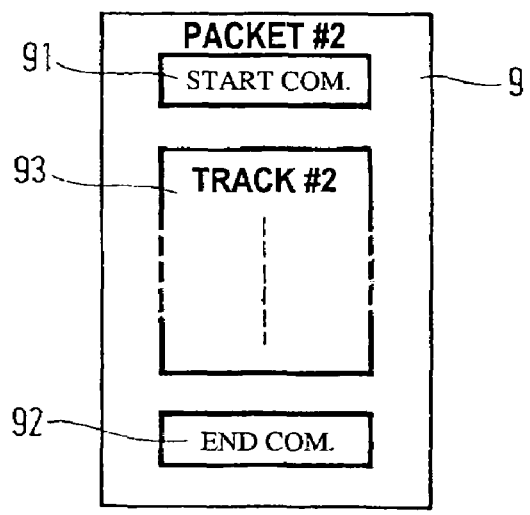
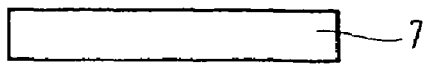
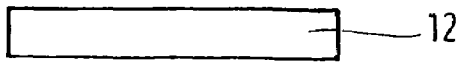

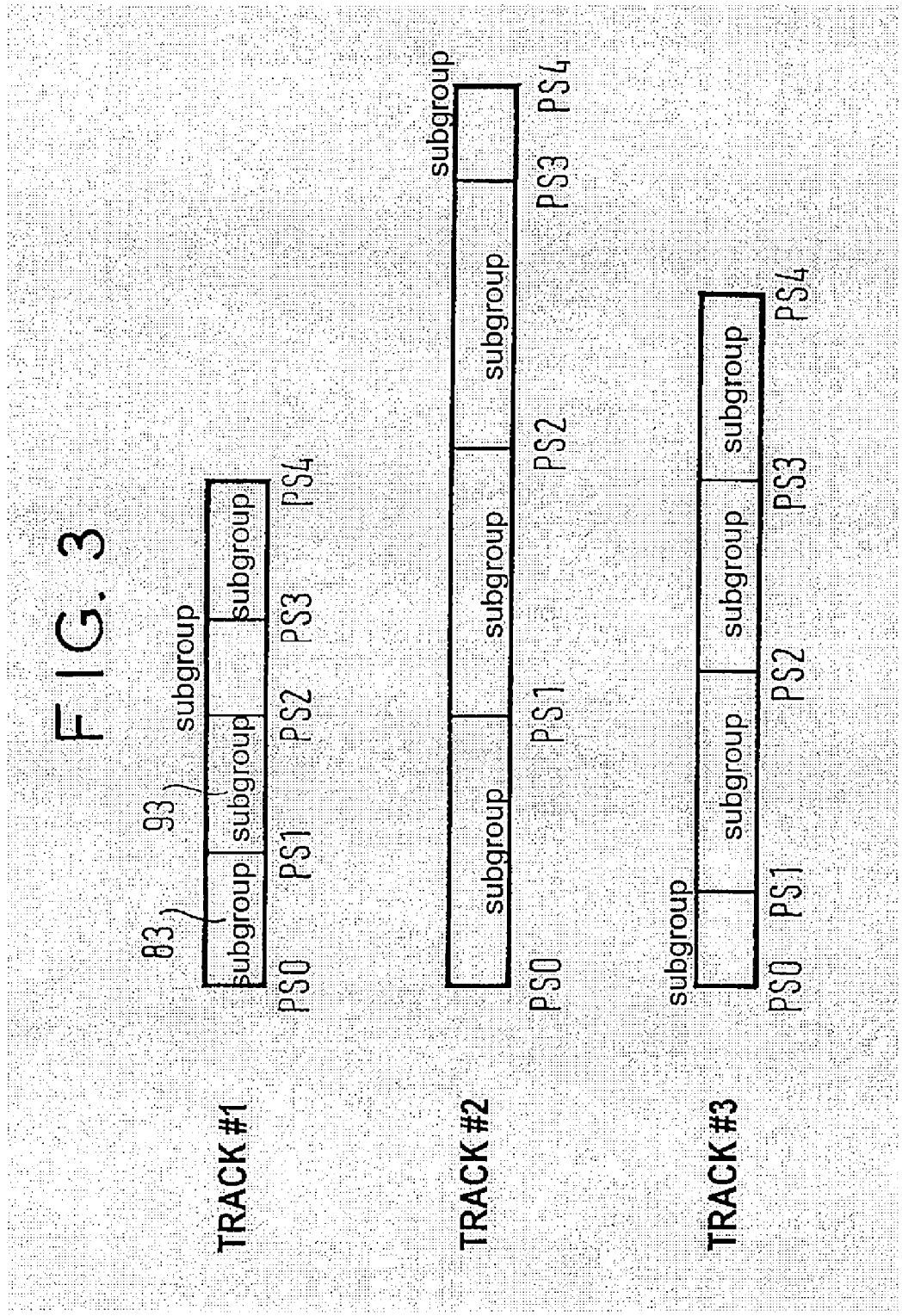

DEVICE FOR GENERATING A MULTIMEDIA FILE ADDRESSED TO A TELECOMMUNICATIONS TERMINAL AND RELATED MULTIMEDIA FILE

FIELD OF THE INVENTION

The present invention relates to the field of telecommunications, and more particularly it relates to a device for generating a multimedia file for sending to a telecommunications terminal, the file being made up of data groups corresponding to respective types of content for the multimedia file.

The invention also relates to a multimedia file for sending to a telecommunications terminal, said file comprising a plurality of data packets.

A particularly appropriate application for the methods and device of the invention lies specifically in that which is commonly referred to as the "mobile Internet".

The invention relates more particularly to the field of telecommunications services involving multimedia data such as video, audio, graphics, text, hypertext, and other data.

DESCRIPTION OF THE RELATED ART

Until now, information has been disseminated over a telecommunications network in compliance with very specific techniques. There is the "pull" technique where a content supplier makes information for sending out available in a database. Users gain access thereto after finding out the address of the database. The address can constitute the subject matter of an advertising campaign using traditional means such as posters, TV, radio, or other databases belonging to other content suppliers. That technique is used essentially over the Internet. Pull techniques thus enable users to access the information they desire specifically, and thus enables them to obtain good quality access to information. By definition, the information is targeted since it is the result of a selection made by the user.

However, pull techniques are not suitable for broadcasting. Such techniques can be implemented only when the user is already aware of the existence of information made available on the network. Thus, the population reached in this way is small even if the percentage of this population that is actually interested by the transmission is large.

Information can also be disseminated by another technique known as the "push" technique. That technique consists in a content supplier making the information that is to be transmitted widely available. Users then have access to this information via suitable receivers, either free of charge or on payment. Radio and TV are major applications for so-called "push" dissemination techniques.

Another application lies in the multimedia messaging system (MMS). The MMS system serves to send messages having a high level of multimedia content. This may involve not only photographs, images, and graphics, but also video sequences and recordings of conversations, for example, associated as "attachments" to short messages. Provision is also made for messages to be sent from a mobile telephone to a mobile telephone or from a mobile telephone to an e-mail address, and vice versa.

At present there exist different standards making use of multimedia files. In this respect, it should be observed that files can be presented in various protocols such as hypertext markup language (HTML), wireless markup language (WML), compact HTML (cHTML), or synchronized multimedia integration language (SMIL).

When such a multimedia file is downloaded from a server to a mobile telephone via the mobile telecommunications network, the various items of content (images, text, sounds, animation, . . . ) attached to the file (each content item either being included in the file itself or being specified by a hypertext link) are often transmitted to the mobile terminal using the "streaming" technique. A problem then arises in synchronizing the various items of content so that they can be played back coherently on the user interface. This problem is particularly troublesome when content is being transmitted by the streaming technique since the terminal does not have sufficient memory space to download the multimedia content in full before executing it. When different kinds of multimedia data are conveyed simultaneously in the form of packets (in blocks belonging to the Internet protocol IP, or transmission control protocol (TCP), or user datagram protocol (UDP), and/or real time transfer protocol (RTP), it is difficult to plan synchronization of these various kinds of data coming from the different media (where the term "media" is used to designate a type of multimedia data, e.g. sound data, graphics data, etc.). Certain media can require more bandwidth and will consequently become available locally on the terminal later than other media, even though they need to be synchronized quickly with said other media that has already arrived and been stored by the terminal and that is waiting to be executed and interpreted on the user interface.

One solution for solving the problem of synchronizing media conveyed by the network is provided by the SMIL protocol. However that protocol defines only the starting point for all of the media and it does not verify whether the blocks of media content are all available on the terminal when they need to be executed synchronously. As a consequence, if a data packet is lost in transmission over the network or if it arrives offset in time compared with the other packets with which it is to be synchronized, then the various packets corresponding to the various media are no longer synchronized.

SUMMARY OF THE INVENTION

An object of the present invention is to remedy the above-mentioned problem.

To this end, the invention provides a device for generating a multimedia file for sending to a telecommunications terminal, the file being made up of data groups corresponding to respective types of content in the multimedia file, the device being characterized in that it comprises:

means for splitting up each of said data groups into respective pluralities of data subgroups as a function of synchronization points associated respectively with the beginning and the end of execution on man-machine interface means of the terminal, the subgroups associated with identical respective beginning and end synchronization points being for simultaneous execution on the man-machine interface means; and assembly means for assembling the multimedia file in the form of a plurality of packets each comprising a plurality of data subgroups associated with respective identical beginning and end synchronization points.

As a result, the invention makes it possible for of the data subgroups (types of content in the multimedia file) that are received at the terminal to be synchronized independently of any differences in length between certain data groups compared with others.

Furthermore, since no constraint concerning the content type is specified, the invention enables a multimedia file to be generated regardless of the media concerned (content type: image, graphics, sound, . . . ).

Also, if a file or a packet of data groups is lost in transmission over a network or arrives offset in time relative to other packets, this does not spoil synchronization, and the terminal continues to execute subsequent packets. All that occurs is a discontinuity in the execution of the various synchronized media due to the loss of the packet, but so far as the user of the terminal is concerned, this discontinuity corresponds to a single dropout or interruption in the presentation, and it affects the same amount of time for all of the synchronized media. Thus, after such an interruption, the multimedia presentation continues in coherent manner with all of the media still being synchronized.

In an embodiment, the device of the invention comprises description means for describing the synchronization points in the multimedia file.

In an embodiment of the invention, said data groups comprise text data, optionally animated image data, optionally compressed sound.

An embodiment of the invention comprises a relay server suitable for receiving data groups corresponding to respective types of multimedia content, for delivering a multimedia file grouping together said data groups, the server being characterized in that it includes a multimedia file generator device of the invention.

The invention also provides a multimedia file for sending to a telecommunications terminal, said file comprising a plurality of data packets and being characterized in that:

each of said data packets corresponds to a concatenation of data subgroups relating to respective types of multimedia file content and associated with respective identical synchronization points for the beginning and the end of execution on man-machine interface means.

In an embodiment, the file of the invention comprises description means for describing the synchronization points associated with the multimedia file.

In an embodiment, the telecommunications terminal to which said file is to be sent is a mobile terminal of the type comprising a radiotelephone and/or a personal digital assistant provided with wireless telecommunications means, or a fixed terminal of the personal computer type connected to the Internet.

BRIEF DESCRIPTION OF THE DRAWINGS

The invention will be better understood on reading the following description and on examining the accompanying drawings. The drawings are given purely by way of non-limiting indication of the invention. In the figures:

FIG. 2 shows a multimedia file structure in an embodiment of the invention;

FIG. 3 shows multimedia data groups split up at synchronization points in accordance with the invention; and FIG. 4 shows a device for generating a multimedia file in an embodiment of the invention.

DETAILED DESCRIPTION

Figure 1:
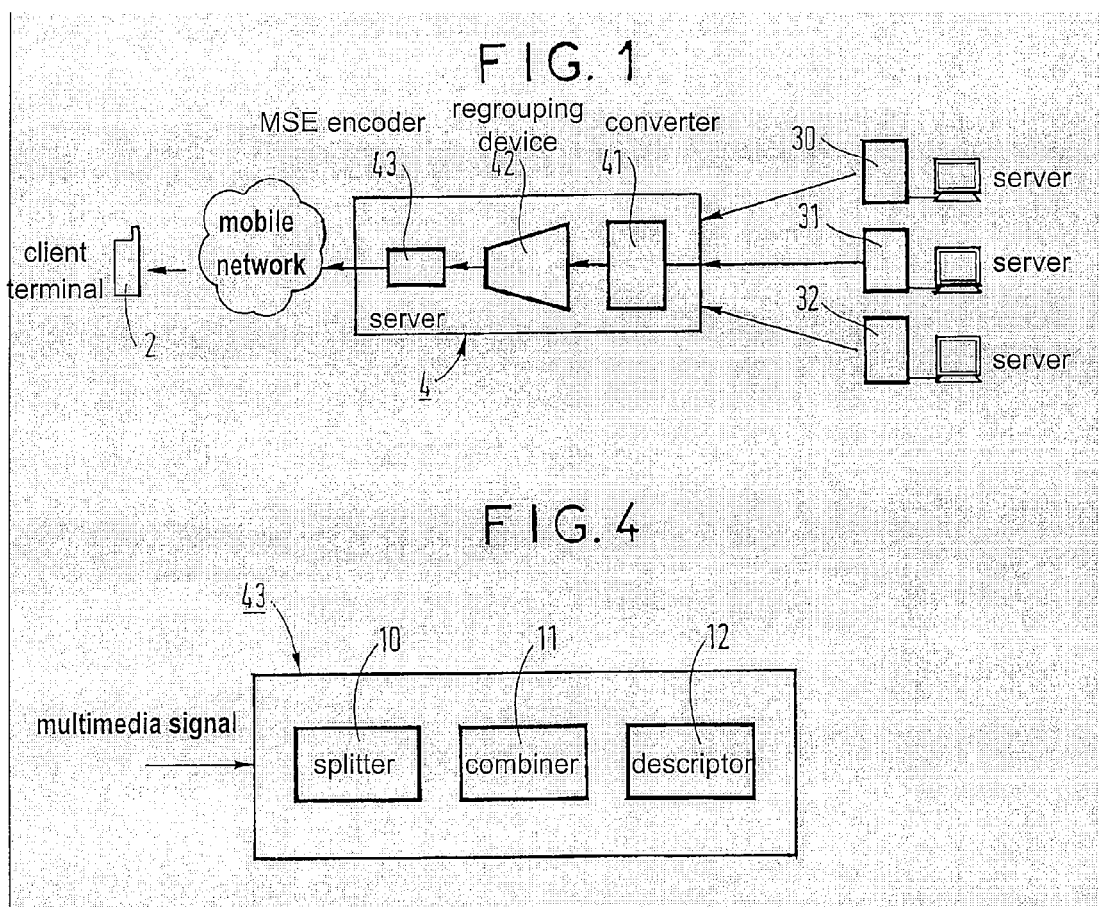
FIG. 1 shows a multimedia transmission system going towards a user terminal.

FIG. 1 shows a system for transmitting multimedia data to a client terminal 2. Servers 3 containing data of differing content, referred to as media servers, are shown at one of the ends of the transmission system 1. These content servers can contain any type of content. For example, the server 30 is a text data server, the server 31 is an image server, and the server 32 is an animated image server. These three servers are going to send data specific to each of them to an MMS relay server 4 in response to a download request from the server 4. The different kinds of data are then converted into a predetermined format. For example, the conversion device 41 at the inlet to the server 4 is a device implementing the SMIL standard, as mentioned in the introduction to the present application. The SMIL standard is a text format which is supported by various Internet applications businesses (Internet navigators, content readers, . . . ). Once the media data has been converted by the device 41, it is grouped together and compressed in a device 42 for grouping together and applying linear compression to multimedia data, in conventional manner. The data as processed in this way is then delivered to a device 43 for generating multimedia files of the invention.

In the present embodiment, the device 43 is an MSE encoder. As explained below, this encoder serves to generate multimedia data packets that are built up in fully synchronized manner, thus enabling the various different media to be presented synchronously to the user once the packets have been delivered by the encoder 43 and received by the terminal 2. Because the various media are synchronized at the terminal, the text and the images displayed on the screen, the sound played by the terminal loudspeaker, etc. are all delivered in fully coherent manner.

It should be observed that the block 41 is drawn with dashed lines since it is not essential in the transmission system 1. It is possible to envisage the data being transmitted from the servers 30, 31, 32 to the regrouping device 42 without necessarily requiring the different kinds of data to be formatted in a first predetermined format.

FIG. 2 shows an example of a structure for a multimedia file 5 as constructed by the encoder 43. The file 5 comprises firstly a header 6 and an end-of-file system command 7 for marking the ends of the file 5. The body of the file 5 comprises a plurality of packets 8, 9, . . . also referenced packet #1 and packet #2.

Each packet 8, 9, . . . uses the same packet-defining syntax: a start-of-packet system command 81, 91 and an end-of-packet system command 82, 92. Between these two commands, each packet comprises a plurality of data subgroups. For reasons of simplicity, FIG. 2 shows two data subgroups 83 and 84 for packet #1 and two data subgroups 93, 94 for packet #2, it being understood that each packet may include a great deal more subgroups depending on how the media are broken down, as explained below. These data subgroups, referenced track #1, track #2, . . . comprise respective data relating to the same medium. For example, track #1 comprises commands and/or data for displaying text, track #2 comprises commands and/or data for displaying images, and track #3 (not shown in FIG. 2) comprises commands and/or data (optionally compressed) for playing back sound.

Each data subgroup is a split-off portion of a corresponding data group as shown in FIG. 3. Thus, as shown in FIG. 3, the subgroup 83 of the first packet #1 comprises data stored in the medium of track #1 and defined by beginning and end synchronization points PS0 and PS1. Similarly subgroup 84 of the first packet #1 comprises data stored in the medium of track #2 and defined by the same beginning and end synchronization points PS0 and PS1. The same applies for data subgroup 85 extending between the same two synchronization points as above and relating to the medium of track #3. Continuing with this logic, it will be understood that the principle on which packets are built up is to assemble together in a single data packet all of the data subgroups coming from the various media tracks that are defined between identical synchronization points. These synchronization points are fixed by an assembler at the relay server 4. The assembler splits up the multimedia signal coming from the device 42 using conventional splitter means 10, splitting the different media of the signal at synchronization points PS0 to PS4 (as shown in FIG. 3). As mentioned above, these points are determined so as to correspond accurately for execution purposes. In one embodiment of the present invention, the assembler is represented by the encoder 43 of FIG. 1 and FIG. 4.

As shown in FIG. 4, the subgroups of all of the media (or tracks) which correspond via common synchronization points are then reassembled in a single packet by means of a combiner 11, which packet is formatted using the above-mentioned syntax, for example, and is then integrated in the multimedia file in a manner that preserves time coherence.

It will be observed that it is assumed that the multimedia file will comprise a plurality of packets. It could also comprise a single packet, with subsequent packets being conveyed in subsequent multimedia files.

In order for the terminal to be able to recognize the synchronization points, the assembler uses conventional means to write the synchronization points on a script page 12 describing the various synchronization points in the multimedia file. The script file accompanies the multimedia file or is integrated therewith. In one embodiment of the present invention, the assembler is represented by the encoder 43 of FIG. 1 and FIG. 4.

Naturally, the invention is not limited to the embodiments described.

Thus, it may be applied to any type of message sending system over any type of network (WEB, WAP, . . . ). It is intended both for mobile terminals (radio telephones, personal digital assistants having wireless telecommunications means, . . . ) and also for personal computers connected to the Internet.

Its advantage lies in its fully object-oriented nature.

The invention claimed is:

1. A device for generating a multimedia file for sending to a telecommunications terminal, the file being made up of data groups corresponding to respective types of content in the multimedia file, the device being characterized in that it comprises:

means for splitting up each of said data groups into respective pluralities of data subgroups as a function of synchronization points associated respectively with the beginning and the end of execution on man-machine interface of the terminal, the subgroups associated with identical respective beginning and end synchronization points being for simultaneous execution on the man-machine interface;

assembly means for assembling the multimedia file in the form of a plurality of packets, each packet comprising a plurality of different types of the data subgroups associated with respective identical beginning and end synchronization points, wherein the assembly means assembles the multimedia file after the means for splitting splits up each of said data groups; and description means for describing the synchronization points in the multimedia file, wherein the description means describes the synchronization points in the multimedia file after the assembly means assembles the multimedia file.

2. A device according to claim 1, characterized in that said data groups comprise text data, optionally animated image data, optionally compressed sound.

3. A device according to claim 1, further comprising a relay server suitable for receiving data groups corresponding to respective types of multimedia content, for delivering a multimedia file grouping together said data groups.

4. The device according to claim 1, wherein a beginning synchronization point of a first subgroup of a first data group of the data groups is synchronized with a beginning synchronization point of a second subgroup of a second data group of the data groups and an ending synchronization point of the first subgroup of the first data group is synchronized with an ending synchronization point of the second subgroup of the second data group.

5. The device according to claim 1, wherein the means for splitting determines fixed points for the synchronization points.

6. A relay server suitable for receiving data groups corresponding to respective types of multimedia content, for delivering a multimedia file grouping together said data groups, the relay server comprising a device for generating a multimedia file for sending to a telecommunications terminal, the file being made up of data groups corresponding to respective types of content in the multimedia file, the device being characterized in that it comprises:

means for splitting up each of said data groups into respective pluralities of data subgroups as a function of synchronization points associated respectively with the beginning and the end of execution on man-machine interface of the terminal, the subgroups associated with identical respective beginning and end synchronization points being for simultaneous execution on the man-machine interface;

assembly means for assembling the multimedia file in the form of a plurality of packets, each packet comprising a plurality of different types of the data subgroups associated with respective identical beginning and end synchronization points, wherein the assembly means assembles the multimedia file after the means for splitting splits up each of said data groups; and description means for describing the synchronization points in the multimedia file, wherein the description means describes the synchronization points in the multimedia file after the assembly means assembles the multimedia file.

7. The relay server according to claim 6, wherein said data groups comprise text data, optionally animated image data, optionally compressed sound.

8. A device for generating a multimedia file for sending to a telecommunications terminal, the file being made up of data groups corresponding to respective types of content in the multimedia file, the device being characterized in that it comprises:

a splitter operable to split up each of said data groups into respective pluralities of data subgroups as a function of synchronization points associated respectively with the beginning and the end of execution on man-machine interface of the terminal, the subgroups associated with identical respective beginning and end synchronization points being for simultaneous execution on the man-machine interface;

an assembler operable to assemble the multimedia file in the form of a plurality of packets, each packet comprising a plurality of different types of the data subgroups associated with respective identical beginning and end synchronization points, wherein the assembler assembles the multimedia file after the splitter splits up each of said data groups; and a descriptor for describing the synchronization points in the multimedia file, wherein the description means describes the synchronization points in the multimedia file after the assembly means assembles the multimedia file.

9. A device according to claim 8, characterized in that said data groups comprise text data, optionally animated image data, optionally compressed sound.

10. A device according to claim 8, further comprising a relay server suitable for receiving data groups corresponding to respective types of multimedia content, for delivering a multimedia file grouping together said data groups.

* * * * *